United States Patent
Roelofs (10) Patent No.: US 6,270,414 B2
(45) Date of Patent: *Aug. 7, 2001

(54) EXOSKELETAL PLATFORM FOR CONTROLLING MULTI-DIRECTIONAL AVATAR KINETICS IN A VIRTUAL ENVIRONMENT

(75) Inventor: Gregory Robert Roelofs, San Jose, CA (US)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,143

(22) Filed: Dec. 31, 1997

(51) Int. Cl.$^7$ .............................. A63F 13/00; A63F 9/24; G06F 17/00; G06F 19/00
(52) U.S. Cl. ................................. 463/36; 463/37; 463/30; 463/31; 463/34; 463/38; 463/39; 472/59; 472/60; 345/156; 345/157; 345/167; 345/164
(58) Field of Search ................................ 463/36, 37, 38, 463/39, 30, 31, 34; 472/59, 60; 345/156, 167, 157, 164, 163, 165, 166; 434/34, 55

(56) References Cited

U.S. PATENT DOCUMENTS

| 3,834,702 | * | 9/1974 | Bliss | 273/86 B X |
|---|---|---|---|---|
| 4,817,950 | * | 4/1989 | Goo | 273/148 B X |
| 5,028,073 | * | 7/1991 | Harms et al. | 280/840 X |
| 5,104,119 | * | 4/1992 | Lynch | 482/5 X |
| 5,252,068 | * | 10/1993 | Gryder | 434/30 X |
| 5,253,295 | * | 10/1993 | Saada et al. | 380/23 X |
| 5,589,639 | * | 12/1996 | D'Antonio et al. | 73/714 X |
| 5,605,462 | * | 2/1997 | Denne | 434/55 X |
| 5,689,994 | * | 11/1997 | Nagai et al. | 74/89.15 X |
| 5,737,505 | * | 4/1998 | Shaw et al. | 395/119 X |
| 5,759,107 | * | 6/1998 | Nagel | 472/47 X |
| 5,782,639 | * | 7/1998 | Beal | 434/29 X |
| 5,792,031 | * | 8/1998 | Alton | 482/78 X |
| 5,846,134 | * | 12/1998 | Latypov | 463/46 X |
| 5,902,214 | * | 5/1999 | Makikawa et al. | 482/4 X |
| 5,913,727 | * | 6/1999 | Ahdoot | 463/39 X |
| 5,930,741 | * | 7/1999 | Kramer | 702/153 X |
| 5,951,404 | * | 9/1999 | Oishi et al. | 472/60 X |
| 5,982,390 | * | 11/1999 | Stoneking et al. | 345/474 X |

FOREIGN PATENT DOCUMENTS

0489469A1    6/1992    (EP) .............................. G06K/11/18

* cited by examiner

*Primary Examiner*—Valencia Martin-Wallace
*Assistant Examiner*—Binh-An Nguyen
(74) *Attorney, Agent, or Firm*—Harold Tsiang (57) ABSTRACT

A system, apparatus and method enabling a participant to control the multi-dimensional kinetics of their avatar in a virtual environment. The participant accomplishes this control by selectably transitioning among various movements ("motion states") from which are derived avatar motions and motion-related positions. The participant's motion states not only comprise interaction data and are correlated to avatar motion, but also are associated with selected, minimal actual motion in the participant's physical surroundings. The apparatus comprises a mount, a motion base and a support: the mount interfaces with the participant, enabling the participant to have a selected range of motion; the motion base is disposed relative to the mount so as to enable contact with the participant and, associated with such contact, provides for detection of the motion states; and the support couples the mount and the motion base so as to provide the relative disposition thereof. The system comprises a network system, a computing station and a kinetic control device coupled to the computing station, wherein (i) the kinetic control device comprises a mount, a motion base and a support, as previously described and (ii) the network system has a selected topology, the computing station being coupled to the network system in accordance with the topology.

36 Claims, 3 Drawing Sheets

EXOSKELETAL PLATFORM FOR CONTROLLING MULTI-DIRECTIONAL AVATAR KINETICS IN A VIRTUAL ENVIRONMENT

BACKGROUND OF THE INVENTION

This invention relates to a system, apparatus and method for enabling a participant to interact in a virtual environment and, particularly, a system, apparatus and method for enabling a participant to control multi-dimensional kinetics of an avatar in a virtual environment.

Virtual environments comprise computer-generated, generally three-dimensional representations of a real, physical setting. The setting can be a city, a mall, an individual store, a building, a suite of offices, an individual office or some other space. The representations can be more or less realistic both in terms of their rendering of the real world and in terms of the human senses that are supported.

In any case, a virtual environment generally comprises virtual objects, the objects typically including entities that either are animate or inanimate. Inanimate entities may include features of the environment, e.g. a wall in a virtual office that is always an inanimate wall in the office. Animate entities may include so-called avatars and bots. Bots are images that, generally, operate autonomously from the participants to perform predetermined tasks or provide features within the environment. A bot can include, for example, a wall that transforms to deliver incoming messages. An avatar, by comparison, is an image that represents, and is controlled by, a participant and that typically supports one or more of the following: (i) arm, hand and other body gestures or movements, (ii) facial expressions, (iii) speech and (iv) motion.

However configured, a virtual environment generally beckons its participants to become immersed in the sensory experience it provides. To do so, the participants interact with the environment's objects. As an example, social interaction between participants is conducted by interaction among such participants' avatars, the interaction occurring, e.g., as the avatars' paths converge during a stroll in a virtual park. As another example, a participant can interact with a group of avatars, a timekeeper/umpire bot and a soccer object in a virtual soccer match.

In both such examples, a participant exercises their avatar by moving its location relative to the other objects in the environment (hereafter referred to as "avatar kinetics"). To do so, the participant typically operates one or more conventional input devices of the participant's computing station. These input devices typically include a keyboard, pointing devices, virtual reality gloves, body-sensing suits or other sensing attire.

These input devices are acceptable for controlling certain avatar movement (e.g. movement of an avatar's hand to wave). However, they have shortcomings with respect to avatar kinetics. Pointing devices and virtual reality gloves, for example, are hand-operated. By comparison, avatar kinetics correlate to the biomechanics of the participant's lower body movements (e.g., hips, legs and feet). To enhance correlation between participant biomechanics and avatar kinetics, body-sensing suits and other such attire (e.g., virtual reality socks) may be used. Even so, the participants, so attired, are compelled to actually travel around their physical surroundings in order to control the kinetics of their respective avatars.

Such travel, a shortcoming in itself, also tends to be inconsistent with the virtual experience. As an example, the participant is generally tethered to its computing station either by a cable or by the maximum distance limiting radio-based connections. As another example, the participant's physical surroundings are unlikely to match the virtual environment of the participant's avatar. Due to the tether and/or the surroundings, then, the participant may encounter an abrupt encumbrance to continued motion while the participant's avatar is encountering unencumbered space.

One solution is a treadmill. However, a treadmill has it own shortcomings. One such shortcoming is that treadmills generally rely on a belt which travels freely in only a single dimension. Indeed, the travel freedom typically is along only one direction in that single dimension. Another such shortcoming is that treadmills tend to have inertia associated with the mass of the drums supporting the belt. This fly-wheel type inertia requires substantial power to control which power must come either (i) from the participant themselves, which is potentially dangerous, or (ii) from a substantial motor which requires significant control mechanisms and, therefore, potentially is both expensive and dangerous.

In general, the quality of the participant's experience is largely determined by the level and quality of interaction supported by the environment. In some cases, however, interaction supported by the environment can be exploited only with the proper resources being available to the participant at the participant's computing station. In the specific case of avatar kinetics, conventional input devices simply are insufficient resources.

Accordingly, a need exists for proper resources directed to controlling multi-dimensional avatar kinetics in a virtual environment. More particularly, a need exists for enhanced input devices that correlate such kinetics to a participant's lower body movements, while liberating the participant from actual motion in their physical surroundings.

SUMMARY OF THE INVENTION

An object of this invention is to overcome the limitations associated with conventional input devices as respects participants' control of multi-dimensional avatar kinetics in a virtual environment.

Another object of this invention is to provide enhanced input devices which devices correlate multi-dimensional avatar kinetics to a participant's lower body movements, while liberating the participant from actual motion in their physical surroundings.

According to one aspect of the invention, an apparatus is provided that enables a participant to control the multi-dimensional kinetics of their avatar in a virtual environment. The participant accomplishes this control by selectably transitioning among various movements ("motion states") from which are derived avatar motions and motion-related positions. The participant's motion states not only comprise interaction data and are correlated to avatar motion, but also are associated with selected, minimal actual motion in the participant's physical surroundings.

The apparatus comprises a mount, a motion base and a support. The mount interfaces with the participant, enabling the participant to have a selected range of motion. The motion base is disposed relative to the mount so as to enable contact with the participant and, associated with such contact, provides for detection of the motion states. The support couples the mount and the motion base so as to provide the relative disposition thereof.

In one embodiment, the apparatus' mount is implemented so that the selected range of motion enables the participant to perform movements establishing and transitioning among motion states, while restraining the participant from selected undesirable motion in the physical environment.

In another embodiment, the apparatus' support comprises a selected number of terrain cells. Each such cell includes a terrain actuator. Each terrain actuator is operable independently and selectably cooperatively with one or more of the other terrain actuators, so as to provide for adjusting the relative positions of the respective terrain cells in and about one or more coordinates. In doing so, the terrain cells impart to the motion base terrain-like features correlative to terrain of the virtual environment.

In yet another embodiment, the apparatus also comprises at least one of a motion detect control and a haptic control.

In a second aspect of the invention, a system is provided for enabling a virtual environment as previously described with reference to the apparatus aspect. The system comprises a computing station and a kinetic control device coupled to the computing station, the kinetic control device comprising a mount, a motion base and a support, as previously described. In one embodiment, the system also comprises a network system, the network system having a selected topology and the computing station being coupled to the network system in accordance with the topology. In another embodiment, the system also comprises a selected number of input/output devices for providing interaction data to the system, the input/output devices operating in cooperation with the kinetic control device.

In a third aspect of the invention, a method for enabling the above-described virtual environment is provided. The method comprises the steps of: (i) physically linking the participant to a kinetic control device; (ii) enabling the participant to interact with a virtual environment via one or more senses; (iii) constraining the participant's movements and motion to a confinement space; (iv) enabling the participant to transition substantially among a plurality of motion states; (v) detecting the motion states; and (vi) providing interaction data representative of the detected motion states to at least one of a computing station and a network system. In one embodiment, the method also includes the step of adjusting at least one of (i) the virtual environment as to the participant's avatar and (ii) selected physical parameters of the kinetic control device.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

DETAILED DESCRIPTION OF THE PREFERRED EMBODIMENTS

The present invention contemplates a system, apparatus and method that provides for participant control of multi-dimensional avatar kinetics in a virtual environment and, in particular, provides for correlation between such avatar kinetics and a participant's lower body movements, while liberating the participant from actual motion in their physical surroundings.

Figure 1:
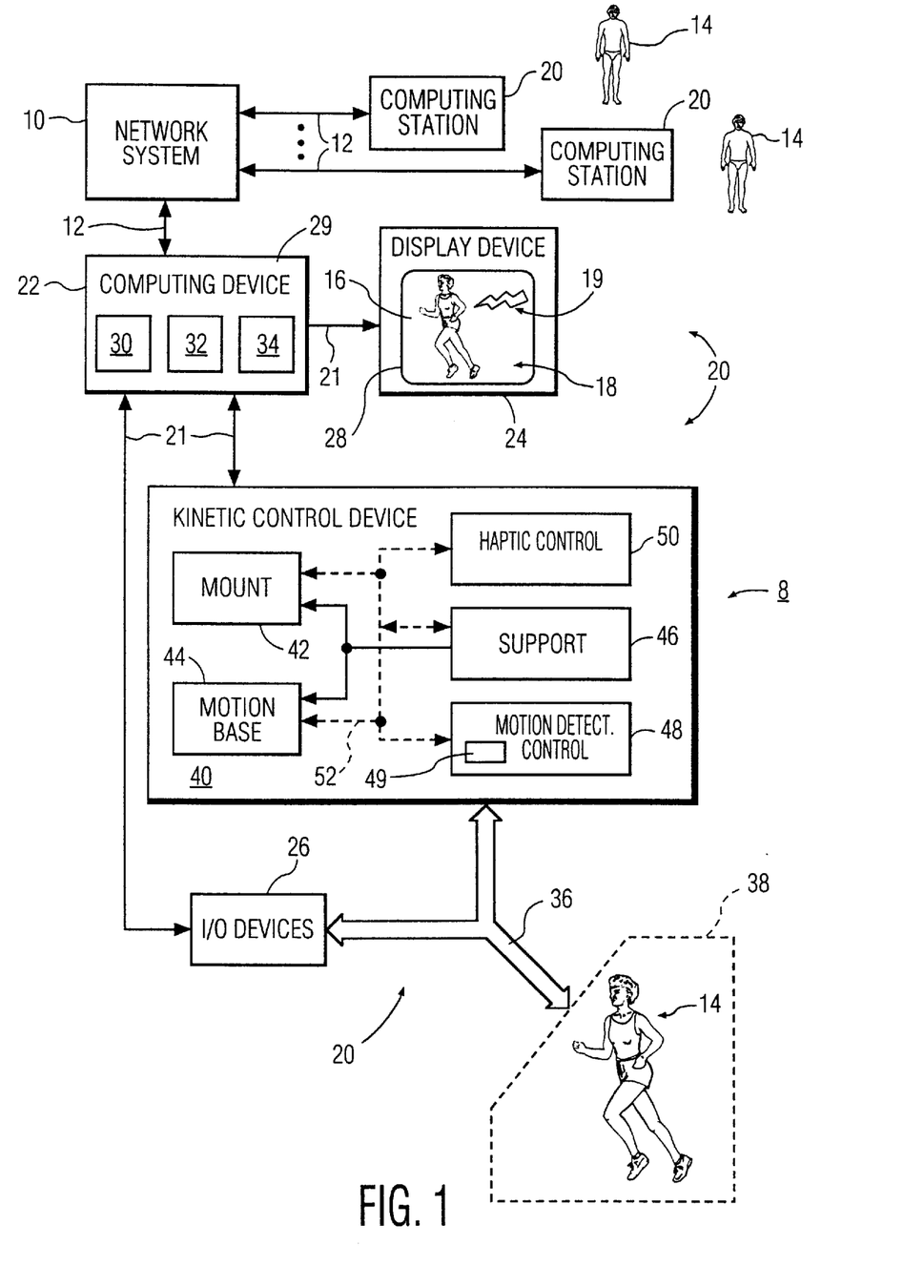
FIG. 1 is a block diagram of a virtual environment system, including a kinetic control device, according to the present invention.

As shown in FIG. 1, a virtual environment system 8, as contemplated by this invention, comprises a network system 10 to and/or through which are coupled, via communication channels 12, a plurality of computing stations 20. Each of the computing stations 20 has associated therewith a participant 14 who interacts with the virtual environment via the respective station 20.

The interaction includes movement and motion. For the purposes of this discussion, movement refers to the positional change of one or more of an participant/avatar's body parts relative to other such body parts, while motion refers to the positional change of the avatar relative to environment and motion state refers to the participant's movements from which is derived avatar motions or motion-related positions. Examples of avatar motions or motion-related positions include: standing (one foot or two); walking; leaning; weight-shifting; running; sprinting; sliding; being on tip-toe (s) or tip-toeing; hopping (one foot or two); skipping; jumping (one foot or two); kneeling (one or two knees); crouching; lying on one's back, side, stomach or otherwise; sitting (including on one's hands); standing on one's hand(s) or head; cart-wheeling; rolling; and falling.

It is to be recognized that avatar motions and motion-related positions preferably are derived from correlative motion states for any participant point of view, including first person (participant sees the virtual environment through, e.g., their avatar's eyes) and third person (participant sees their avatar and other objects in the virtual environment). It is also to be recognized that the participant's movements are so correlated independent of whether or not there is employed any real furnishings, game-pieces, implements or accessories (e.g., analogous of real world things, such as skates, skis, cycle-like structures and otherwise).

The network system 10 comprises a selected topology. An example topology includes a star network having a centralized computing system to which all the computing stations 20 are connected, wherein (i) the centralized computing system runs server software that administers the virtual environment (e.g., receiving from and transmitting to participants 14 data concerning motion of avatars), (ii) the stations 20 run client software that controls the local virtual experience, including obtaining and transmitting data to the server respecting its participant's interaction with and in the environment ("interaction data"), and (iii) the server software controls the distribution of data, including interaction data received from each station 20, among all stations 20. Another example topology employs direct connections among computing stations 20, wherein (i) typical connections rely on protocols such as transmission control protocol (TCP) and/or user datagram protocol (UDP), (ii) server/client software is essentially distributed among each of the stations 20 and (iii) each station's software sends its participant's interaction data to each of the other stations 20. Yet another example topology employs direct connections wherein, rather than communicating interaction data among all participants, a participant communicates its data to a selected group address (i.e., multicasting) such that each station 20 of a particular group address can choose whether to accept/reject the data. It is to be recognized that other topologies can be employed without departing from the principles of the invention, including, for example topologies that combine one or more features of the above topologies.

A computing station 20 according to the present invention, comprises a computing device 22 coupled, via connections 21, to each of one or more display devices 24, one or more input/output (I/O) devices 26 and a kinetic control device 40. Although the computing device 20 is coupled to only one kinetic control devices 40, it is understood that plural such devices 40 can be employed without departing from the principles of the invention. As an example, the devices 40 can be selectably arrayed in the space surrounding a participant, the devices 40 being associated with various body parts.

The connections 21 typically comprise wire/cabling, but, in the case of the kinetic control device 40 and one or more of the I/O devices 26, the connections preferably are implemented using a wireless technology (e.g., infrared technology).

Other than by observing the virtual environment 16 through the display device 24, the participant 14 interacts with the environment 16 through interaction connections 36 linking the participant to the I/O devices 26 and the kinetic control device 40. In such interaction, the participant 14 is constrained by/to the confinement space 38, it being contemplated that, in providing correlation between avatar kinetics and a participant's lower body movements, the participant 14 is substantially liberated from being in actual motion relative to their physical surroundings. That is, the participant's motion is constrained by/to the confinement space, but such constraint is substantially inapplicable to the participant's movements and its avatar's motion.

The confinement space 38 can be variously implemented without departing from the principles of the invention. As an example, the confinement space 38 can be absent of any real furnishings, game-pieces, implements or accessories. As another example, however, the confinement space 38 can be fully configured, e.g., as a multi-media immersion chamber complete with any combination of installed media I/O devices 26. As yet another example, the confinement space 38 can be implemented to accommodate and/or be adaptable to more than one participant 14.

Each display device 24 has a screen 28, the screen imaging the environment 16, including the participant's avatar 18 and a bot 19 (e.g., a lightning bolt seeking to shock the avatar 18). While a preferred display device 24 comprises a head-mounted display (HMD) it is to be understood that other devices can be used without departing from the principles of the invention (e.g., an array of monitors).

The I/O devices 26 preferably include one or more data acquisition devices that provide data representative of the participant's interaction with the virtual environment. In that regard, the I/O devices 26 preferably are responsive to the movements of the participant's body parts or sense-based socialization. It is to be recognized that the devices can include one or more of a keyboard, a microphone, audio speakers, olfactory generators/detectors, pointing devices (e.g., a mouse, trackball, touch pad, and/or a joystick), facial gesture detecting devices, virtual reality gloves, haptic suits and/or other haptic attire, as well as other data acquisition devices, alone or in combination, without departing from the principles of the invention. Moreover, the I/O devices 26 can also include, without departing from the principles of the invention, printers, plotters, external storage drives (e.g., removable disk and tape drives), CD-ROMs, DVDs, document scanners, communication devices, and other devices that provide no data representative of the participant's interaction with the virtual environment.

The computing device 22 typically includes a general purpose computer 29 having a processor 30, a memory system 32 (e.g., volatile memory and/or nonvolatile mass memory) and supporting software 34. The software 34 preferably includes an operating system ("OS"), a virtual environment package (e.g., either client, client/host or other software associated with the topology of the environment), and some number of application programs. The OS preferably supports a graphical user interface (GUI) and typically comprises a collection of component programs. The OS component programs generally include (i) device drivers associated with the respective I/O devices 26, (ii) display device drivers associated with the display devices 24, and (iii) one or more device drivers associated with the kinetic control device 40.

It is to be understood that the invention admits a broad range of OS architectures and, in that regard, no particular commercial OS, or architectural characteristics, are preferred for implementing this invention. Moreover, it is to be recognized that any implemented OS can be architectured other than as described above, without departing from the principles of the invention. As an example, the architecture can omit, combine or re-arrange various of the device drivers, with or without adding new components.

The kinetic control device 40 preferably includes a mount 42, a motion base 44 and a support 46, the support 46 coupling the mount 42 and the motion base 44. As is discussed further below, the kinetic control device 40 preferably also comprises a motion detect control 48 and a haptic control 50. Each of the controls 48 and 50 are coupled to a bus 52. The bus 52 is further coupled to one or more of the mount 42, the motion base 44 and the support 46, these couplings being responsive to the implementation.

The mount 42 interfaces with the participant 14, preferably around the waist. The mount 42 preferably is implemented to carry some or all of the participant's body weight. In addition, the mount 42 preferably is implemented so as to provide a selected range of motion to the participant. Such range of motion is to enable the participant 14 to perform movements (and confined motion) so as to establish and transition among avatar motion states within the virtual environment 16, while restraining the participant 14 from undesirable motion (e.g. off the motion base 44).

The motion base 44 comprises a bed on which motion states are detected through contact with the participant and forces/torques/pressures associated therewith. For example, the contact of a motion state is between the participant's extremities (e.g., one or both feet or hands) and some portion(s) of the base 44. Moreover, the contact preferably is calibrated, participant-by-participant, motion state-by-motion state, in order to enhance detection performance of the motion (e.g. speed and accuracy). Although, as shown, the participant's contact with the motion base 44 is direct, it is to be recognized that the contact can be indirect, i.e., through the employ of real furnishings, game-pieces, implements and/or accessories (e.g., analogous of real world things). Accordingly, the motion base 44 preferably is implemented as a general-purpose device, admitting either/both direct and indirect contact and supporting one or more selected dimensions for detection of motion states correlating to one or more dimensions of avatar motion.

The support 46 provides for relative disposition of the mount 42 and the motion base 44. In one embodiment, the relative disposition responds to selected physical parameters of the participant 14 (e.g., the length of their legs and their weight) so as to place the participant at an elevation, relative to the motion base 44, substantially appropriate to selected motion states. As an example, the elevation can be appropriate to standing and/or walking.

The relative disposition can be static, but preferably it is dynamic. As to the latter, the support 46 preferably provides for adjusting the relative disposition of the mount 42 and the motion base 44. In particular, the adjustment enables an enhanced range of motion states and is responsive to the nature of the virtual environment and the interaction of the participant therewith, i.e., the avatar's activities in the terrain of the environment. As an example, the adjustment can be appropriate to striding (e.g., cross-country skiing on a flat terrain) at one moment and to crouching (e.g., telemark skiing down a slope) at another moment.

In the dynamic case, the support 46 preferably enables adjustment, while also continually accounting for physical parameters of the participant 14 (e.g., the length of their legs and their weight). The support 46, thereby, maintains placement of the participant at an elevation, relative to the motion base 44, substantially appropriate to the changing motion states.

Figure 2:
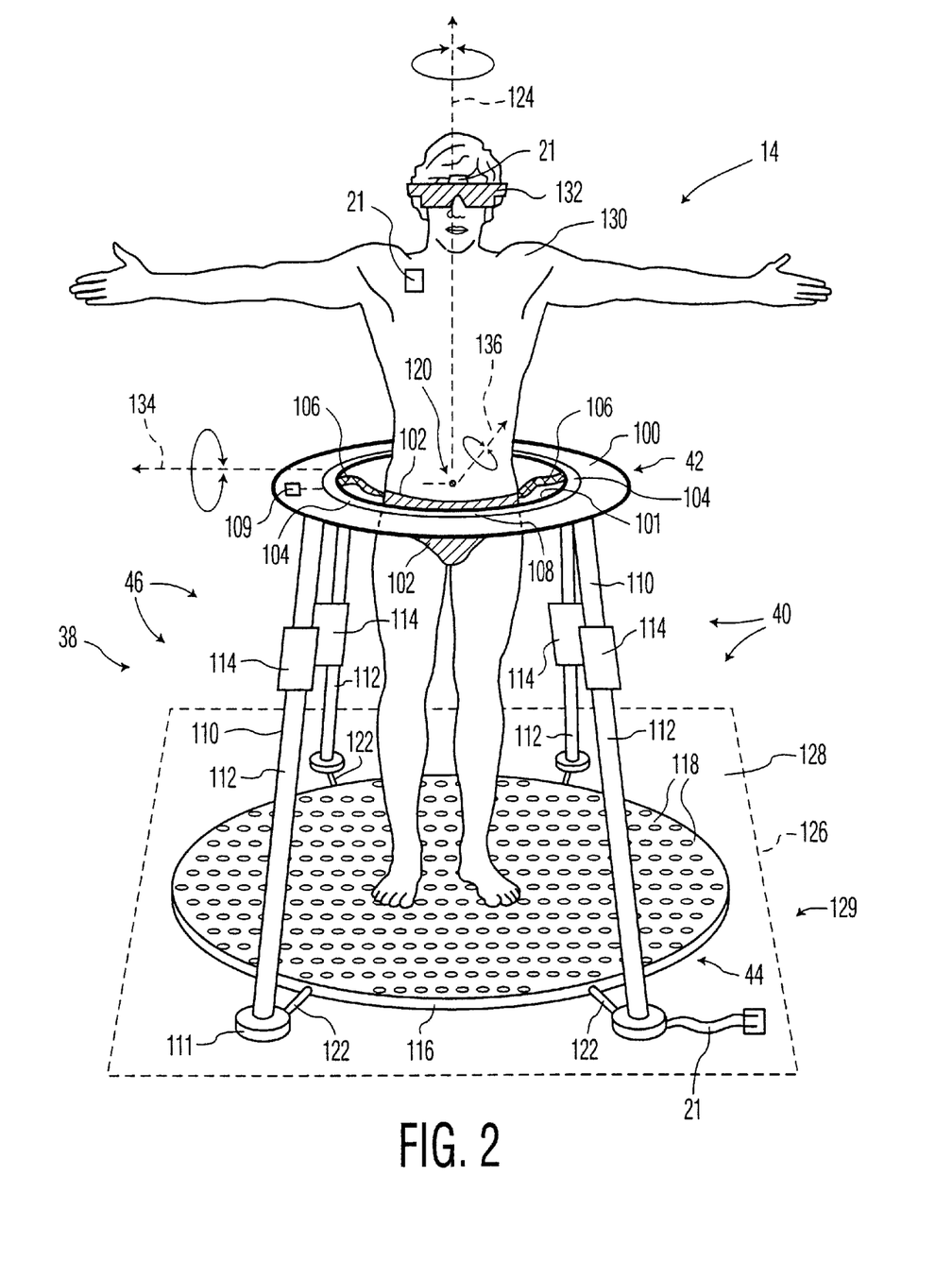
FIG. 2 is a block diagram of a kinetic control device, according to the present invention.
Figure 3:
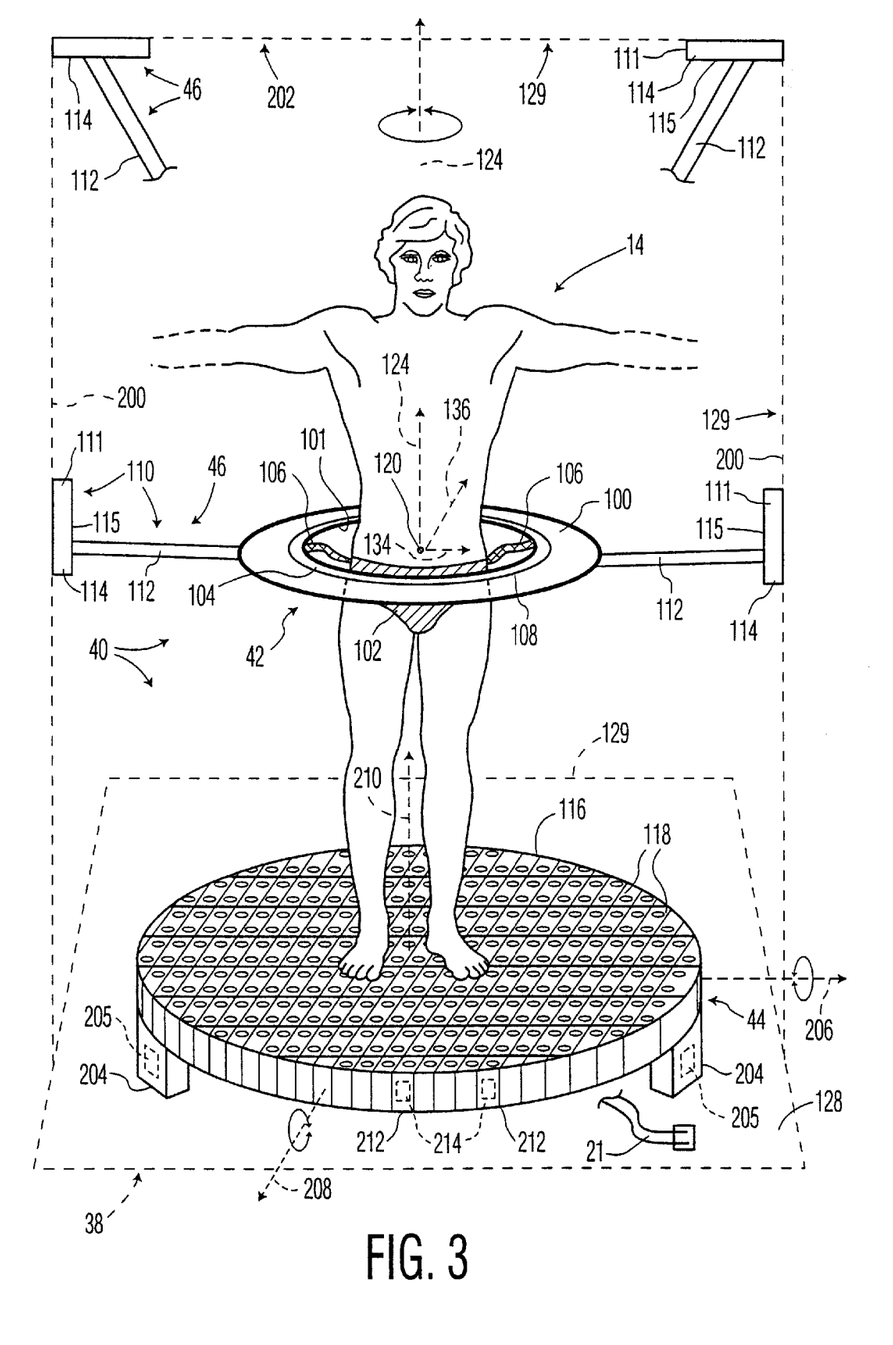
FIG. 3 is a block diagram of a kinetic control device, according to the present invention.

In order to effect the relative disposition, it is preferred that the support 46 provide for independent rectilinear adjustment, relative to the physical surroundings, of each of the mount 42 and the motion base 44. However, it is to be understood that the support 46 can be otherwise implemented without departing from the principles of the invention. As an example, the support 46 can be implemented to provide that one of the mount 42 or base 44 is positionally fixed, while the other of the base 44 or mount 42 is rectilinearly adjustable via the support 46. FIG. 2 shows an embodiment of a kinetic control device 40 wherein the motion base 44 is stationary (i.e., placed on a supporting surface, e.g., a floor), and the substantial center 120 of the mount 42 is rectilinearly adjustable along an axis 124 substantially normal to a plane 126 of the base 44. By comparison, FIG. 3 shows an embodiment of a kinetic control device 40 wherein both the mount 42 and the base 44 are rectilinearly adjustable, which adjustments are in multiple, relative dimensions.

In additional to rectilinear adjustment, the support 46 preferably provides for independent rotational adjustment of each of the mount 42 and the motion base 44. However, it is to be understood that the support 46 can be otherwise implemented without departing from the principles of the invention. As an example, the support 46 can be implemented to provide that one of the mount 42 or base 44 is rotationally fixed, while the other of the base 44 or mount 42 is rotationally adjustable. The support 46 can also be implemented to provide that neither the mount 42 nor the base 44 is rotationally adjustable. FIGS. 2 and 3 provide examples of rotational adjustability that preferably are provided by the support 46.

The support 46 preferably provides a direct mechanical coupling between the mount 42 and motion base 44. As shown in FIG. 2, the support 46 is a frame 110 which suspends the mount 42 above the base 44 and to which the base 44 is connected (e.g., for enhanced stability).

However, the support 46 can be implemented other than by providing a direct mechanical coupling between the mount 42 and the base 44, without departing from the principles of the invention. As shown in FIG. 3, for example, the support 46 suspends the mount 42 above the base 44 in the absence of any direct mechanical coupling. In these cases, the coupling preferably is indirect in that the base 44 is maintained in place by the physical surroundings 129 (e.g., the walls, floor and ceiling to/on which the components of the device 40 are attached/placed).

Turning to FIG. 2, an embodiment of a kinetic control device 40 is shown in accordance with the invention. The device's mount 42 comprises (i) an annulus 100 having an interior opening 101, (ii) a saddle 102, wearable by the participant 14, (iii) a rotation mechanism 104 disposed on or in the annulus 100 and (iv) one or more extensions 106 by which the saddle 102 is attached to the rotation mechanism 104.

With the saddle 102 so attached to the rotation mechanism 104 and with the participant 14 seated in the saddle 102, the participant 14 is enabled to rotate substantially freely. The rotation is about an axis 124 which passes through the substantial center 120 of the interior opening 101 of the annulus 100. In one embodiment, the axis 124 is substantially normal to a plane 126 generally associated with at least one portion of the base 44. As shown in FIG. 2, the plane 126 is associated with substantially the entire base 44. In a typical application of this embodiment, the plane 126 is provided by a substantially planar surface 128 (e.g., a floor) in a home, in an office or in other physical surroundings 129 of the participant 14.

The rotation mechanism 104 preferably has associated therewith one or more rotation sensors 108. The sensors 108 detect, and provide interaction data respecting, the rotation of the participant 14 (e.g., via the saddle 102) within and relative to the annulus 100. It is to be recognized, however, that the sensors 108 can be omitted without departing from the principles of the invention. Where provided, the sensors preferably are implemented so as to operate in conjunction with other I/O devices 26, particularly devices 26 which are directed to sense body movements. In FIG. 2, for example, the rotation sensors 108 would be implemented to operate in conjunction with the haptic suit 130.

The annulus 100, as depicted in FIG. 2, preferably is of unitary construction. An advantage thereof is durability and safety. However, it is to be recognized that the annulus 100 can be otherwise constructed without departing from the principles of the invention. As an example, the annulus 100 can be of two piece construction so as to provide, e.g., for more convenient ingress and egress.

The saddle 102 preferably is substantially permanently attached to the rotation mechanism 104 via the extensions 106. However, it is to be recognized that the saddle may be removably attached to either/both the extensions 106 and the annulus 100, without departing from the principles of the invention. Again, such alternative is to provide enhanced convenience.

It is also to be recognized that the mount 42 can be implemented in the absence of the rotation mechanism 104, without departing from the principles of the invention. In such case, the saddle 102 preferably is omitted such that the participant 14 can adjust their position within the annulus 100. In any case, the mount 42 preferably provides for restraining the participant's real lateral motion (e.g., along one or more of axes 134, 136).

In FIG. 2, the device's support 46 comprises a frame 110 constructed of a plurality of jacks 112. The jacks 112 have associated therewith respective vertical adjusters 114 and footings 111. The footings 111 provide a foundation for the frame 110. The vertical adjusters 114 enable adjustment of the length of each jack. By operation of the respective vertical adjusters 114, the substantial center 120 associated with the annulus 100 and, therefore, the mount 42 is rectilinearly adjustable (e.g., along the axis 124) relative to the device's base 44. As previously described, such rectilinear adjustability enables the support 46 to effect the relative disposition between the mount 42 and the motion base 44.

The vertical adjusters 114 also enable the support 46 to provide for rotational adjustment of the mount 42. In that regard, by selective adjustment of one or more of the vertical adjusters 114, the annulus 100 can be rotated about either one or both of the axes 134, 136. In the Figure, these axes are substantially orthogonal to each other, as well as to axis 124.

In this embodiment, the base 44 is stationary. It comprises a bed 116 that provides an array of movement transducers 118. As is described further below, the movement transducers 118 preferably comprise technology enabling detection of the participant's associated motion states based on, e.g., the forces, torques, pressures imparted by the participant 14, at any time and from time to time, on/to one or more of such transducers 118.

The bed 116 is placed on the surface 128 (e.g., a floor) and is connected to one or more of the jacks 112 via couplings 122, e.g., at respective footings 111. The couplings 122 are, e.g., to provide enhanced stability to the frame 110 and to maintain, relative to the frame 110, the placement of the base 44.

The kinetic control device 40 also comprises a two-way connection 21. The connection conveys control signals (e.g., from the computing device 22 to the motion detect control 48 and/or the haptic control 50) and/or interaction data (e.g., from the transducers 118 of the bed 116). As previously stated, the connection 21 typically comprises wire/cabling, as shown. However, the connections preferably are implemented using wireless technology.

The kinetic control device 40 of FIG. 2 is implemented so that the participant 14 can simultaneously employ other I/O devices 26. As shown in the Figure, the participant 14 employs a head mounted display 132 as a display device 24, while being attired in the haptic suit 130. Each of the display 132 and the suit 130 have connections 21 provided through wireless technology.

Turning to FIG. 3, another embodiment of a kinetic control device 40 is shown in accordance with the invention. The device's mount 42 is as described above with respect to FIG. 2. Moreover, as in FIG. 2, the device's support 46 comprises a frame 110. The frame 110 preferably is coupled to the participant's physical surroundings 129. As depicted, the frame 110 is coupled to either/both walls 200 and ceiling/beam 202 via footings 111. (In the discussions that follow, except where indicated explicitly or by context, the frame 110 is described as to solely the coupling to the walls 200. It is to be recognized that the descriptions apply as well to the frame 110 as coupled to the ceiling/beam 202 subject to updates to dimensional matters.)

The frame 110 is constructed of a plurality of jacks 112, the jacks 112 having associated therewith respective vertical adjusters 114. The vertical adjusters 114, in the case of wall coupling, provide for altering the vertical disposition of the respective jacks 112 relative to the walls 200. In the ceiling/beam coupling, the vertical adjusters 114 preferably change the lengths of the jacks 112 to accomplish this function. By operating the adjusters 114, the substantial center 120 associated with the annulus 100 and, therefore, the mount 42 are rectilinearly adjustable (e.g., along the axis 124) relative to the device's base 44. As previously described, such rectilinear adjustability enables the support 46 to effect the relative disposition between the mount 42 and the motion base 44.

The vertical adjusters 114 also enable the support 46 to provide for certain rotational adjustment of the mount 42. In that regard, by selective adjustment of one or more of the vertical adjusters 114, the annulus 100 can be rotated about at least one of the axes 134, 136. In FIG. 3's wall mount, for example, two jacks 112 are shown disposed substantially along axis 134. Accordingly, by providing divergent vertical dispositions of the jacks 112 using the respective vertical adjusters 114, the annulus 100 is rotated about axis 136. It is to be recognized, however, that the jacks 112 can be disposed substantially along axis 136 such that rotation is about axis 134. It is also to be recognized that both such jacks 112 and vertical adjusters 114 can be provided such that rotations are supported about both such axes 134,136.

The support 46 of FIG. 3 also comprises horizontal adjusters 115 associated with respective jacks 112. The horizontal adjusters 115, in the case of wall coupling, preferably change the lengths of the jacks 112 to alter the horizontal disposition of the respective jacks 112 relative to the walls 200. In the ceiling/beam coupling, the horizontal adjusters 115 preferably slide the connection point of the jacks 115 along the ceiling/beam in order to accomplish this function.

By operation of one or more horizontal adjusters 115, the position of the annulus 100 is rectilinearly adjustable. Depending on the number and positions of the jacks 112, the horizontal adjusters 115 provide for rectilinear adjustment along either/both of the axes 134, 136. As previously described, such rectilinear adjustability enables the support 46 to effect the relative disposition between the mount 42 and the motion base 44 in multiple, relative dimensions, e.g., dimensions additional to those provided by the vertical adjusters 114.

The jacks 112 of FIG. 3 can be implemented in various ways without departing from the principles of the invention. One embodiment has the jacks 112 comprising substantially rigid bars, the bars being formed of metal (e.g., aluminum), ceramics, plastics or composites (e.g., carbon fiber). In this embodiment, the jacks 112 preferably are coupled to the annulus 100 and/or the footing 111 using joints that support the aforementioned rotations. Another embodiment has the jacks 112 comprising elastomeric material(s). Such materials provide an amount of flex so as to provide a selected range of motion to the participant (e.g., in establishing the size of the confinement space 38). In this embodiment, the participant 14 has enhanced ability to perform movements and motion to establish and transition among avatar motion states within the virtual environment 16. At the same time, the participant 14 is restrained from undesirable motion (e.g. off the bed 116 of the motion base 44. In each embodiment, the jacks 112 preferably are relatively light in weight and have ratings responding to one or more weight ranges of the participants.

In FIG. 3, the support 46 also comprises one or more standards 204. The standards 204 are disposed on the surface 128 and enable the base 44 to be rectilinearly adjustable. In so enabling, the standards 204 preferably are fixed in position relative to the surface 128.

The standards 204 preferably comprise one or more respective translation mechanisms 205. The translation mechanisms 205 provide, through horizontal and vertical adjustments, for changing the position of the base's bed 116 in any one or more of the x,y,z coordinates 206, 208, 210. Moreover, the mechanisms 205 preferably are independently adjustable so as to enable rotations of the bed 116 about one or more of such coordinates, particularly the x and y coordinates 206, 208. In addition, the mechanisms 205 preferably enable dynamic rectilinear adjustment, e.g., during and to enable the participant's interaction with the virtual environment 16.

Provision of independent rectilinear and rotational adjustability to the mount 42 and motion base 44 tends to obtain immersion advantages. These advances are subject to further enhancement resulting from the use of flexible jacks 112. As an example, not only is the participant 14 enabled to jump, but also, in landing the virtual earth can be activated via the base 44 to give away or, in the case of a virtual trampoline, to provide a bounce. As another example, the participant 14 can be tilted in one direction via the mount 42 and in another (e.g., opposite) direction via the base 44.

In FIG. 3, the support 46 also comprises one or more terrain cells 212. The terrain cells 212 have associated therewith one or more of the movement transducers 118. Moreover, each terrain cell 212 comprises one or more terrain actuators 214. The terrain actuators 214 provide for adjusting, preferably independently and together in selectable groupings, the respective cell 212 as to and about one or more of the coordinates, particularly the z coordinate 210. As such, the bed 116 is enabled to attain variable terrain-like features, including steps, inclines, holes, and other irregularities.

It is to be understood that no particular technology (mechanical, pneumatic, hydraulic, or other) is required to implement the translation mechanisms 205 and the terrain actuators 214 in order to remain within the principles of the invention. Rather, in any particular implementation according to the invention, the employed technology preferably is selected responsive to engineering issues and challenges that are peculiar to that implementation.

It is also to be understood that, although the terrain cells 212 of FIG. 3 are depicted as rectangular, it is to be understood that the cells 212 can be implemented using other shapes (polygonal, arcuate or otherwise), without departing from the principles of the invention. Also without departing from the principles of the invention, the cells 212 can be (i) variable in shape, operation and other parameters, including having separately actuated parts and having non-actuated parts and/or (ii) mutually separated by non-actuated border structures.

As previously stated above, the movement transducers 118 of the motion base 44 preferably comprise technology enabling detection of the participant's associated motion states. Such detection can be variously implemented, including by detection of forces, torques, pressures, temperatures and other parametric phenomena imparted by the participant 14, at any time and from time to time, on/to one or more of such transducers 118.

The movement transducers 118 preferably comprise track-ball-type technology. Track-ball-type technology is commercially available, in various forms. As such, it is to be understood that no particular such technology is required in order to remain within the principles of the invention. Rather, in any particular implementation of movement transducers 118 according to the invention, the employed track-ball-type technology preferably is selected responsive to engineering issues and challenges that are peculiar to that implementation. In any case, however, it is preferred that the employed track-ball-type technology be sufficiently robust to absorb the wear-and-tear associated with the intended use, while also providing accurate performance over a suitably long lifetime. It is also preferred that the employed track-ball-type technology comprise (i) balls having a relatively low-profile, e.g., the balls extend above the surface of the bed 116 to a minimal distance, so as to present to the participant a substantially planar surface of the bed 116, (ii) balls having a selected form factor, e.g., so as to enable a selectably tight areal density in the bed 116 while providing suitably high precision (e.g., ½"–¾"), (iii) balls having an adjustable or controllable dampening factor so as to set/control the freedom of rolling, (iv) balls having a reasonable unit cost, and (v) as discussed further below, balls which support tactile and/or force feedback, e.g., tactile feedback conveying characteristics to the participant that are perceived through the human senses and the force feedback providing real-world feedback, including enabling/disabling slippery and rough surfaces.

It is also to be understood that the movement transducers 118 can be implemented using other than track-ball-type technologies, without departing from the principles of the invention. As an example, the transducers 118 can comprise an array of one or more types. For example, the transducers 118 can be sensitive to horizontal, vertical and angular accelerations, pressure, temperatures and other parametric phenomena.

As stated above with reference to FIG. 1, in one embodiment of the invention, the kinetic control device 40 comprises at least one of a motion detect control 48 and a haptic control 50. The controls 48, 50 preferably are coupled to one or more of the mount 42, the motion base 44 and the support 46, these couplings being responsive to the implementation. The coupling preferably is via bus 52.

In operation, the motion detect control 48 receives control signals (e.g. from the computing device 22) and/or interaction data (e.g., from the transducers 118 of the bed 116). Responsive to the control signals, the motion detect control 48 controls the operation of supported rectilinear, rotational and other positional adjustments associated with one or both of the mount 42 and the motion base 44. The motion detect control 48 also controls the positional and relative operation of the terrain cells 212 of the base 42. These adjustments and operations, as described above, can be provided through employ of various structures.

In receiving interaction data, the motion detect control 48 translates and packages such data for transmission. The transmission generally is to the computing device 22 and, in particular, to the software 34 (e.g., the device driver of the kinetic control device 40). Accordingly, the amount of processing conducted by the control 48 depends on various engineering issues and challenges applicable to the implementation, including the amount of processing sought to be completed by the computing device 22.

In operation, the haptic control 50 receives control signals (e.g. from the computing device 22) and, responsive thereto, provides tactile and force feedback (the forces being active by creating the environment and/or being counteractive by reacting to the motion states). Haptic feedback is provided to the participant through haptic transducers incorporated in the kinetic control device 40.

The haptic transducers can be implemented separately or can be provided by one or more types of the movement transducers 118. As an example, haptic feedback can be provided by controlling the movement transducer's balls: (i) adjusting the grittyness of the surface of the balls themselves, (ii) adjusting the freedom of rolling of the balls by adjusting internal counter-accelerations applied to the balls, and/or (iii) applying a lateral or revolving force (e.g., pulling a carpet out from under the participant) across the bed's surface by coordinated acceleration of the balls. As to track-ball-type technologies supporting the internal application of accelerations European Patent Application No. 91203134.1, filed Nov. 29, 1991 and published Jun. 6, 1992 (Publication No. 0-489-469-A1) is hereby incorporated by reference.

As another example, the movement transducers 118 implement forces that either push the participant away from, or pulls the participant toward, the surface of bed 116 of the base 44. It is preferred that such transducers 118 be accomplished using magnetics.

Haptic feedback preferably is also provided by dynamically controlling the operation of (i) rectilinear, rotational and other positional adjustments of one or both of the mount 42 and the motion base 44 and (ii) the terrain cells 212 of the base 42. To provide this feedback, the haptic control 50 preferably operates in conjunction with the motion detect control 48. As an example, the rotation mechanism 104 preferably comprises one or more rotation drives 109 (FIG. 2). Responsive to control signals from the haptic control 50, the motion detect control 48 activates the drives 109 so as to provide rotational forces to the rotation mechanism 104. To close a feedback loop, the sensors 108 of the rotation mechanism 104 detect interaction data respecting the actual rotation, and provide such data to the haptic control 50 and/or the motion detect control 48, thereby enabling the rotational forces to be adjusted so as to lock in a selected rotation.

It is contemplated that, for optimal performance, the kinetic control device 40 is calibrated. That is, motion states generally are associated with certain types and qualities of contact between the participant (e.g., one or both feet or hands) and some portion(s) of the base 44: each motion state generally is associated with certain combinations and patterns of contact, forces, pressures, torques, gradients and the like, applied to the bed 116 and, in particular, to certain of the movement transducers 118 thereof. Calibration enables linking such motion states, participant-by-participant, motion-state-by-motion-state, in order, e.g., to enhance detection performance of the motion (e.g. speed and accuracy).

Calibration know-how and technology is commercially available, in various forms, including genetic algorithms and training programs. As such, it is to be understood that no particular such know-how and/or technology is required to remain within the principles of the invention. Rather, in any particular implementation according to the invention, the employed calibration know-how and technology preferably are selected responsive to engineering issues and challenges that are peculiar to that implementation.

The kinetic control device 40 can be implemented to accommodate and/or be adaptable to more than one participant 14. That is, the device 40 preferably enables calibration and use by more than one participant 14, either alone or together. In order to enable use by more than one participant 14 at any one time, it is preferred that the kinetic control device 40 include authentication control 49 to distinguish the movements of one participant from another, including to coordinate their movements when together. In one embodiment, the authentication control 49 employs signaling devices to identify and distinguish among participants. In another embodiment, the control 49 employs biometric technologies (e.g., height, weight, temperature, or skin/vein/patterns, and the like, individually or in any combination) to identify and distinguish among participants, the technologies operating either continuously or at discrete times (e.g., when the participant initiates use of the kinetic control device 40). In implementation, the authentication control 49 can be comprised by the motion detect control 48 or otherwise, without departing from the principles of the invention.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. An apparatus for participant control of a multi-dimensional avatar representation in a virtual environment, the apparatus comprising:
    a mount, interfacing with the participant and enabling the participant to have a selected range of motion while restraining the participant from selected undesirable motions in the participant's physical environment;
    a motion base, disposed relative to the mount so as to enable contact with the participant and, associated with such contact, providing for detection of motion states of the participant, said detection of motion states creating interaction data; and
    a support, the support coupling the mount and the motion base and providing the relative disposition of the mount and the motion bases;
    wherein said multi-dimensional avatar representation is a projection of the participant into the virtual environment;
    whereby the participant, when generating interaction data by moving within the physical environment, moves a location of the multi-dimensional avatar representation within the virtual environment.

2. An apparatus as claimed in claim 1, wherein the mount is implemented to carry a selected amount of the participant's body weight.

3. An apparatus as claimed in claim 1, wherein the mount comprises an annulus having an interior opening, the participant being selectably restrained in motion by the interior opening.

4. An apparatus as claimed in claim 3, wherein the mount further comprises a saddle, the saddle being wearable by the participant and being coupled to the annulus.

5. An apparatus as claimed in claim 4, further comprising a rotation mechanism associated with the annulus, the rotation mechanism coupling the saddle to the annulus so that the participant can rotate with respect to the annulus.

6. An apparatus as claimed in claim 5, further comprising at least one of a rotation sensor and a rotation drive, the rotation sensor detecting interaction data as to the participant's rotation with respect to the annulus, and the rotation drive providing rotational forces respecting the participant's rotation with respect to the annulus.

7. An apparatus as claimed in claim 6, comprising both of the rotation sensor and the rotation drive, the rotation sensor and rotation drive being implemented so as to provide a closed feedback loop.

8. An apparatus as claimed in claim 1, wherein the motion base comprises one or more movement transducers.

9. An apparatus as claimed in claim 8, wherein the movement transducers are arranged in a selected array pattern.

10. An apparatus as claimed in claim 8, wherein the movement transducers enable detection of parametric phenomena associated with motion states, as imparted by the participant, at any time and from time to time.

11. An apparatus as claimed in claim 8, wherein the movement transducers comprise track-ball-type technology, the track-ball-type technology comprising track balls, the track balls providing at least one of (i) a relatively low-profile, (ii) a selected form factor, (iii) a selected precision, (iii) an adjustable or controllable dampening factor so as to set/control the freedom of rolling, (iv) a reasonable unit cost, and (v) support for haptic feedback.

12. An apparatus as claimed in claim 8, wherein the movement transducers provide for selected haptic feedback.

13. An apparatus as claimed in claim 1, wherein the motion base comprises a plurality of movement transducers, the movement transducers being implemented so as to enable their calibration, participant-by-participant, motion-state-by-motion-state.

14. An apparatus as claimed in claim 1, wherein the support couples the mount and the motion base indirectly through the employ of selected physical surroundings.

15. An apparatus as claimed in claim 1, wherein the support provides for relative disposition of the mount and the motion base responsive to selected physical parameters of the participant so as to place the participant at an elevation, relative to the motion base, substantially appropriate to selected motion states.

16. An apparatus as claimed in claim 15, wherein the support provides for dynamically adjusting the relative disposition of the mount and the motion base responsive to the virtual environment and the interaction of the participant therewith.

17. An apparatus as claimed in claim 16, wherein the support enables said dynamic adjustment, while continually accounting for selected physical parameters of the participant.

18. An apparatus as claimed in claim 15, wherein the support provides for rectilinear adjustment, relative to the physical surroundings, of at least one of the mount and the motion base.

19. An apparatus as claimed in claim 18, wherein the support provides at least one of (i) rectilinear adjustment in multiple, relative dimensions and (ii) independent rotational adjustment of at least one of the mount and the motion base.

20. An apparatus as claimed in claim 1, wherein the support comprises a selected number of jacks, the respective jacks having associated therewith at least one of a vertical adjuster and a horizontal adjuster.

21. An apparatus as claimed in claim 20, wherein the each vertical adjuster is operable independently and selectably cooperatively with one or more of the other vertical and horizontal adjusters, and each horizontal adjuster is operable independently and selectably cooperatively with one or more of the other vertical and horizontal adjusters.

22. An apparatus as claimed in claim 20, wherein a jack comprises one or more selected elastomeric materials.

23. An apparatus as claimed in claim 20, wherein the support further comprises one or more standards, each said standard being coupled to the motion base and having associated therewith a translation mechanism, and each said translation mechanism being operable independently and selectably cooperatively with one or more of the other vertical and horizontal adjusters and translation mechanisms.

24. An apparatus as claimed in claim 1, wherein the support comprises a selected number of standards, each said standard being coupled to the motion base and having associated therewith a translation mechanism.

25. An apparatus as claimed in claim 24, wherein each translation mechanism is operable independently and selectably cooperatively with one or more of the other translation mechanisms.

26. An apparatus as claimed in claim 1, wherein the support comprises a selected number of terrain cells, each such cell comprising a terrain actuator, each terrain actuator being operable independently and selectably cooperatively with one or more of the other terrain actuators, the terrain actuators providing for adjusting the relative positions of the respective terrain cells in and about one or more coordinates so as to impart to the motion base terrain-like features correlative to terrain of the virtual environment.

27. An apparatus as claimed in claim 1, further comprising at least one of a motion detect control and a haptic control, the respective motion detect and haptic controls being coupled to one or more of the mount, the motion base and the support.

28. An apparatus as claimed in claim 1, further comprising an authentication control.

29. A system for enabling a participant to control the multi-dimensional kinetics of their avatar representation, wherein the avatar representation is a projection of the participant into a virtual environment, the system comprising:
    a computing station, and
    a kinetic control device coupled to the computing station, the kinetic control device comprising
        mount, interfacing with the participant and enabling the participant to have a selected range of motion while restraining the participant from selected undesirable motions in the participant's physical environment;
        a motion base, disposed relative to the mount so as to enable contact between the motion base and the participant and, associated with such contact, providing for detection of one or more motion states of the participant, said detection creating interaction data; and
        a support, the support coupling the mount and the motion base and providing the relative disposition of the mount and the motion base;
    whereby the participant, when generating interaction data by moving within the physical environment, moves a location of the avatar representation within the virtual environment.

30. A system as claimed in claim 29, further comprising a network system, the network system having a selected topology and the computing station being coupled to the network system in accordance with the topology.

31. A system as claimed in claim 29, further comprising a selected number of input/output devices for providing interaction data to the system, the input/output devices operating in cooperation with the kinetic control device.

32. A system as claimed in claim 29, wherein the kinetic control device has associated therewith a confinement space by and to which the participant is physically constrained.

33. A method for enabling a participant to control the multi-dimensional kinetics of an avatar representation, wherein the avatar representation is a projection of the participant into a virtual environment, the method comprising the steps of:
    physically linking the participant to a kinetic control device;
    enabling the participant to interact with a virtual environment via one or more senses;
    constraining the participant's movements and motion to a confinement space, thereby restraining the participant from selected undesirable motions in the participant's physical environment;
    enabling the participant to transition substantially among a plurality of motion states;
    detecting the motion states; and
    providing interaction data representative of the detected motion states to at least one of a computing station and a network system;
    whereby the participant, when generating interaction data by moving within the physical environment, moves a location of the avatar representation within the virtual environment.

34. A method as claimed in claim 33, further comprising adjusting at least one of (i) the virtual environment as to the participant's avatar and (ii) selected physical parameters of the kinetic control device.

35. A method as claimed in claim 34, wherein the kinetic control device is adjusted in accordance with at least one of: (i) haptic feedback; (ii) terrain adjustments of a motion base; (iii) adjustment of the relative disposition of a mount and a motion base responsive to selected physical parameters of the participant so as to place the participant at an elevation, relative to the motion base, substantially appropriate to a selected motion state, the mount and the motion base comprising components of the kinetic control device; and (iv) dynamic adjustment of the relative disposition of the mount and the motion base responsive to the virtual environment and the interaction of the participant therewith, while continually accounting for selected physical parameters of the participant.

36. An apparatus for the input of interaction data concerning lower body movements of a participant in a virtual environment, the apparatus comprising:

an annulus, within which the participant is located such that a plane of the annulus is normal to a longitudinal axis of the participant, said annulus allowing the participant to have a selected range of motion while restraining the participant from selected undesirable motions in the participant's physical environment;

a motion base, located underneath the participant and in contact with the lower body of the participant, said motion base comprising at least one motion base sensor that detects a location of the lower body of the participant; and a support maintaining a position of the annulus;

wherein the interaction data comprises the location detection of the at least one motion base sensor, and the interaction data is input to a computer system running the virtual environment;

whereby the participant moves a multi-dimensional avatar representation of the participant in an virtual environment.

* * * * *